INVENTOR.
STANLEY B. SANDSTROM
BY
Christie, Parker & Hale
ATTORNEYS.

June 4, 1963 S. B. SANDSTROM 3,092,689

AUTOMATIC REGISTRAR

Filed July 22, 1960 4 Sheets-Sheet 2

June 4, 1963 S. B. SANDSTROM 3,092,689

AUTOMATIC REGISTRAR

Filed July 22, 1960 4 Sheets-Sheet 3

CONNECTOR CIRCUIT-28

June 4, 1963 S. B. SANDSTROM 3,092,689

AUTOMATIC REGISTRAR

Filed July 22, 1960 4 Sheets-Sheet 4

INVENTOR.
STANLEY B. LINDSTROM

BY

Christie, Parker & Hale

ATTORNEYS.

United States Patent Office 3,092,689

Patented June 4, 1963

3,092,689
AUTOMATIC REGISTRAR

Stanley B. Sandstrom, Santa Ana, Calif., assignor to Edstan, Los Angeles, Calif., a partnership
Filed July 22, 1960, Ser. No. 44,714
8 Claims. (Cl. 179—2)

Figure 1:
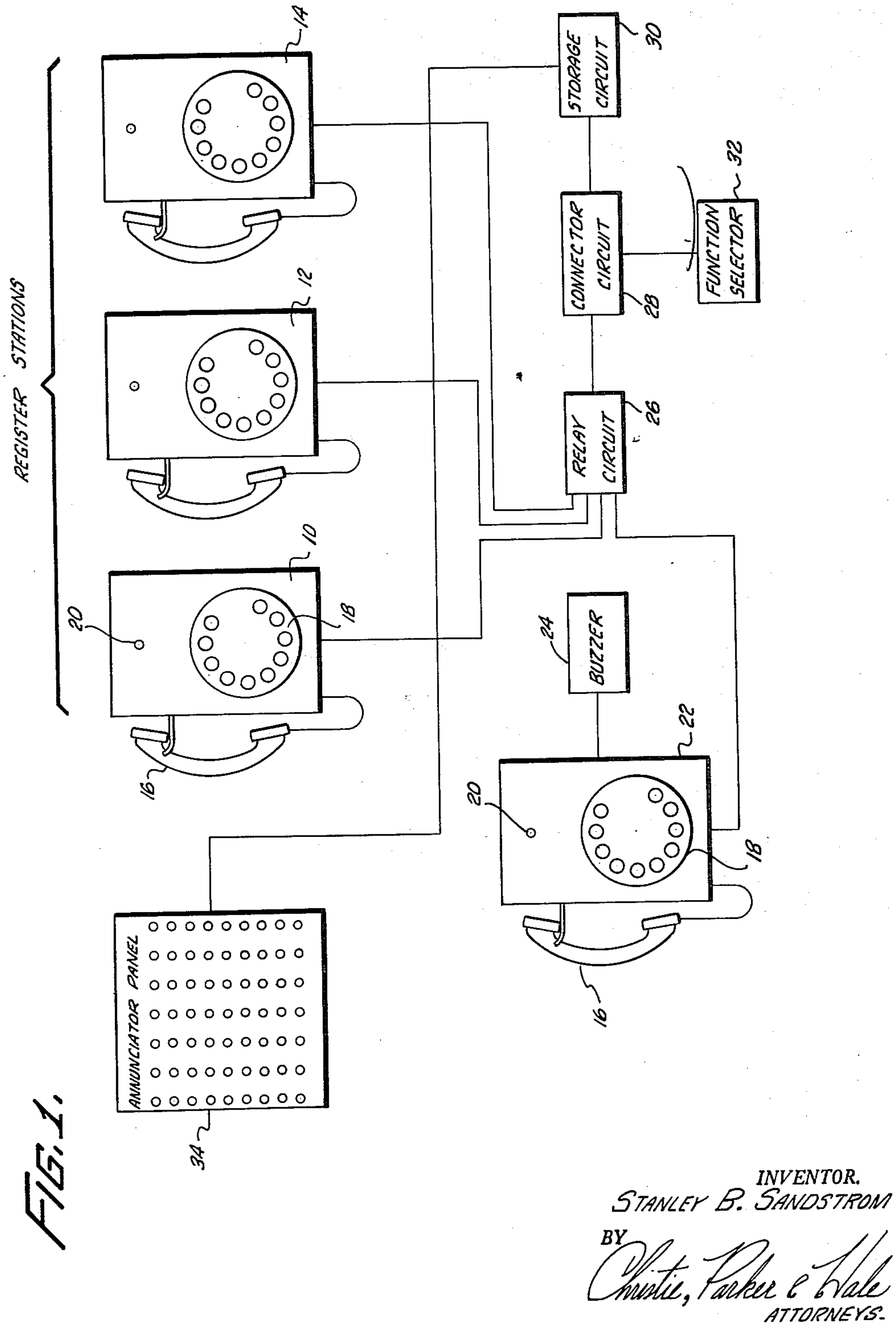

This invention relates to an automatic registrar system, and more particularly, to apparatus for automatically registering various functions, such as the registration of guests in a hotel, the presence of a doctor in a hospital, message notification, and the like.

There has been a need, for example, in large hospitals, to register the presence of individual doctors on the premises. This has generally been done by providing a large annunciator board near one entrance with the names of the doctors listed on the board. A doctor, on entering the premises, actuates a switch next to his name on the board causing his name to be lit. Such an arrangement has several disadvantages. First, it requires the doctor to always go to the location of the annunciator board on entering the hospital. This may be an inconvenience with the doctor, particularly in a large hospital where he may be entering the hospital through any one of a number of possible different entrances. It is also an inconvenience to those who wish to know the presence of a doctor on the premises. For example, the annunciator board being convenient to the PBX operator increases the work of the operator in answering calls by those who are interested in learning whether the doctor is in the hospital. While a number of such annunciator boards could be located at various points throughout the hospital, the cost of installing the requisite cabling between boards becomes prohibitive.

The present invention provides an arrangement in which information can be registered from a plurality of telephone dial stations. The information can be interrogated from any of the stations as well. The system is automatic in that it requires no supervision. The system when used in a hospital, for example, permits the doctor to register "In" from any one of the plurality of stations and to register "Out" from the same or any other one of the stations. It permits him to check if there are any messages for him without disturbing the PBX board operator. It also permits anyone to check from any one of the stations to see whether any particular doctor is in or out of the hospital. The system requires only a single wire pair to communicate from each of the telephone stations to a central control station.

Because of the flexibility of the system, it can be adapted to register other types of information. For example, in a hotel installation it may be used to register the reservation status of hotel rooms, and the housekeeping status of the rooms.

In brief, the present invention accomplishes the above functions by providing an automatic registrar system which includes a plurality of telephone stations, each station including a dial. A plurality of separate addressable memory units are provided at a central location, and switching means, responsive to the dial at any one of the telephone stations, is arranged to connect a selected one of the memory units to a particular telephone station in response to a first group of dial digits. The memory units generate signals indicative of the particular information stored in each of the memory units, which signals relay this information from the memory units to the telephone station when the first group of digits is dialed. At least one additional digit dialed from a particular telephone station establishes new information in the selected memory unit according to the value of the additional digit.

For a more complete understanding of the invention, reference should be made to the accompanying drawings, wherein:

FIG. 1 is a block diagram of the basic system of the present invention; and

Figure 2:
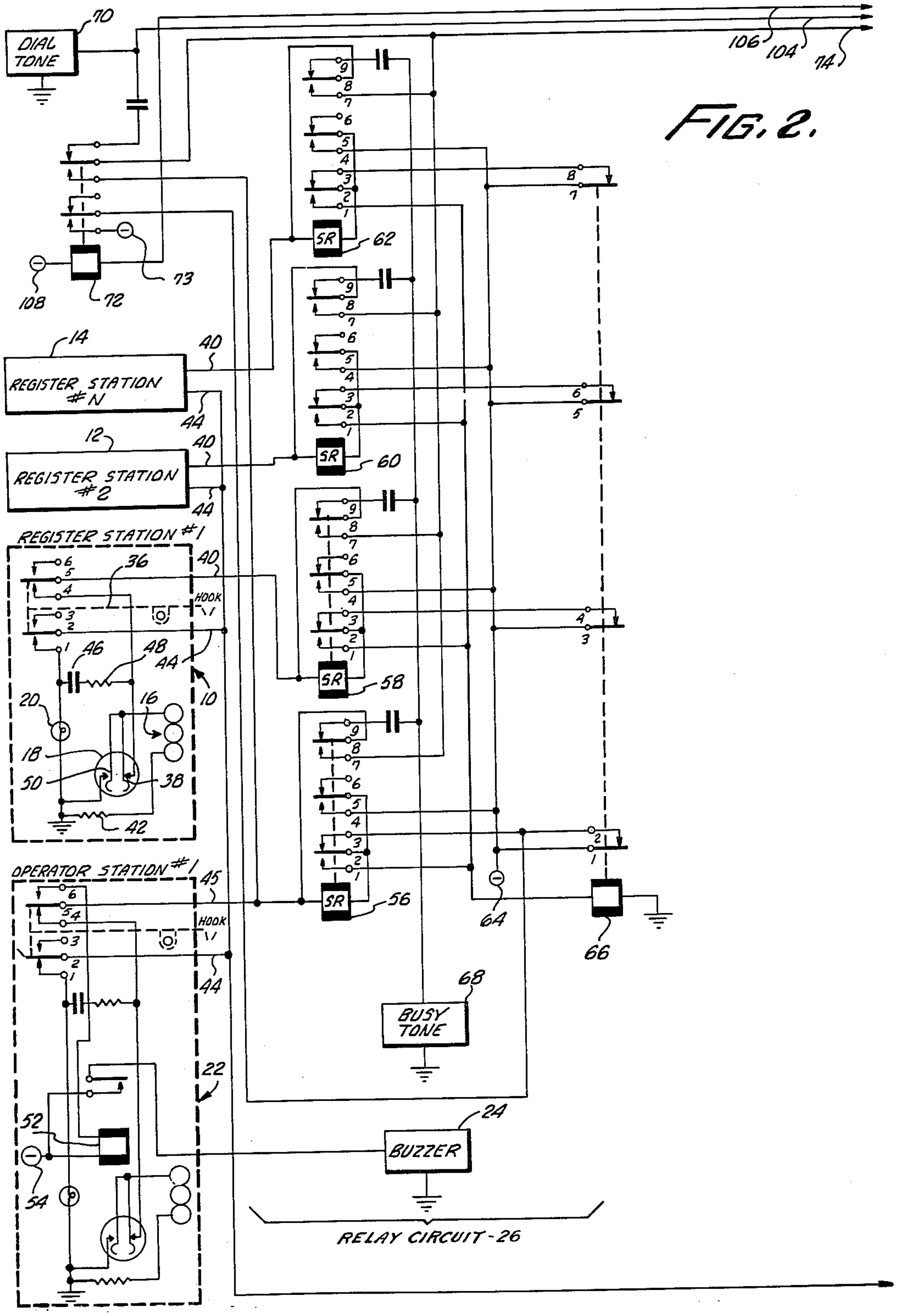
Figure 3:
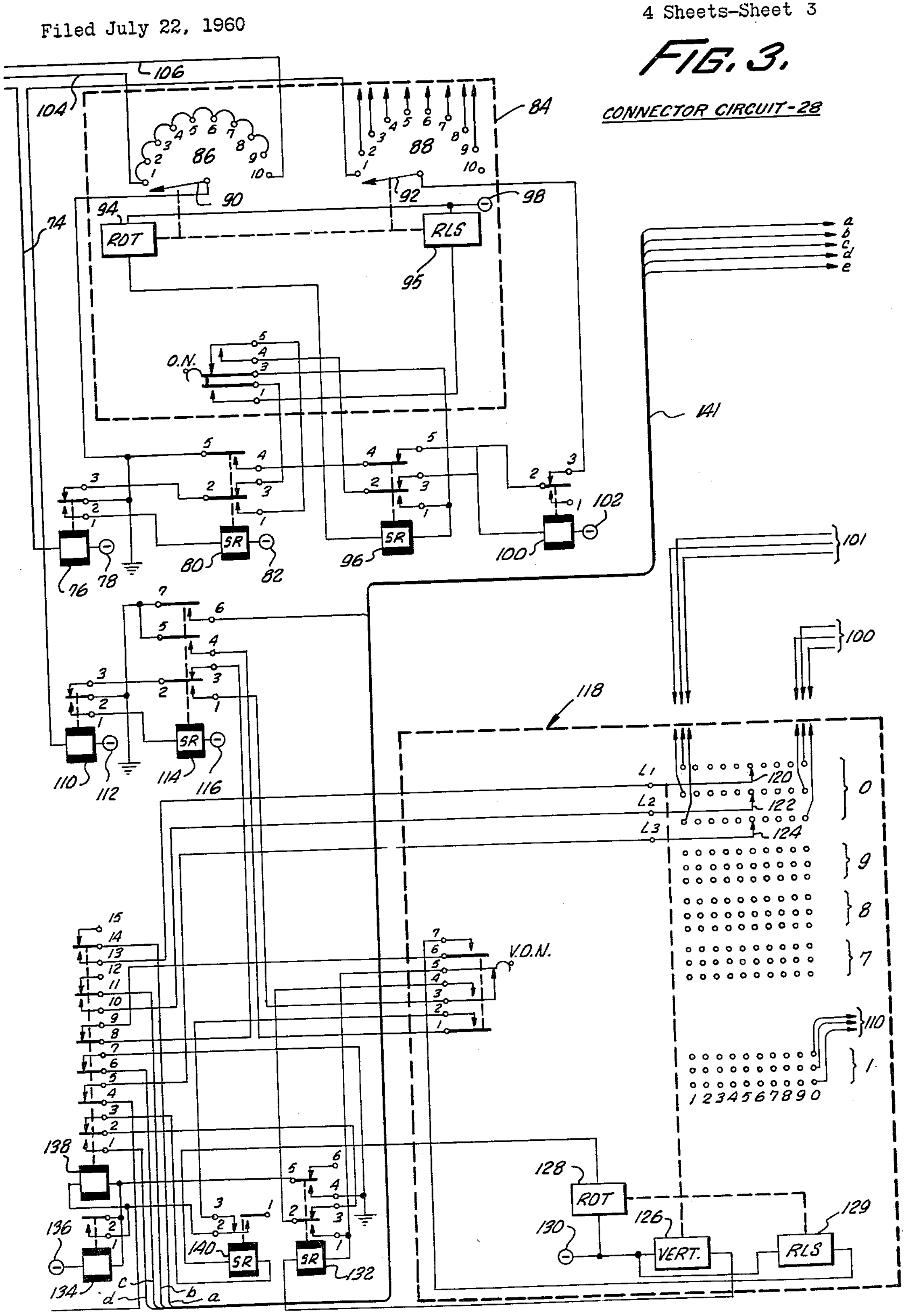
Figure 4:
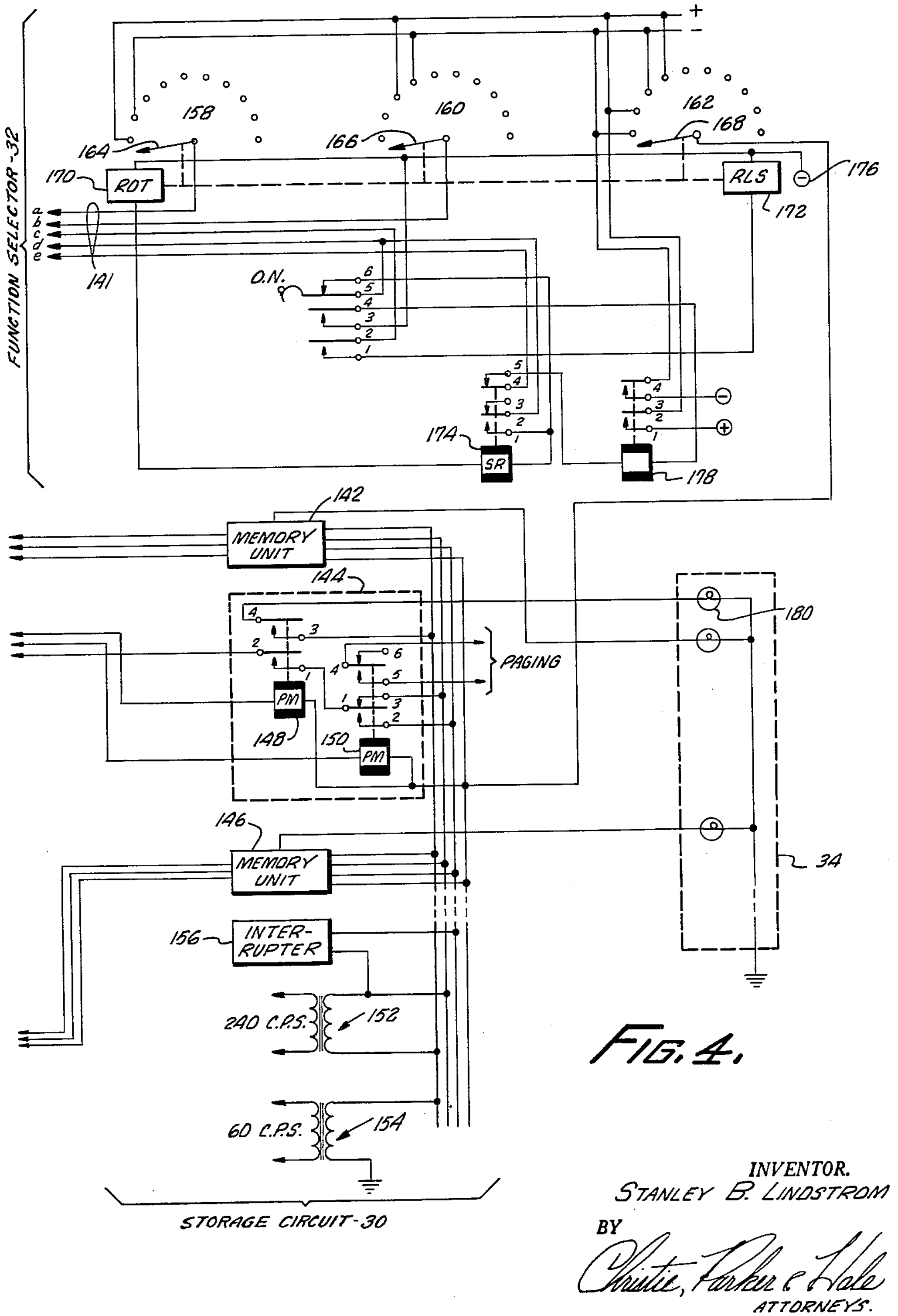

FIGS. 2, 3 and 4 form a complete schematic diagram of one circuited embodiment of the present invention.

Referring to FIG. 1 in detail, the numerals 10, 12 and 14 indicate three register stations each of which includes a telephone handset 16 and telephone dial 18. In addition, each of the register stations may include an indicator light 20. Where three register stations are shown by way of example, it is to be understood that the system may include any number of register stations as may be required for a particular installation.

In addition to the register stations, one additional station, indicated at 22 and referred to as the operator's station, also includes a telephone handset 16, dial 18 and light 20. In addition, the operator's station includes a buzzer 24.

Voice communication is provided between any one of the register stations and the operator station by dialing "0." This sounds the buzzer 24, telling the operator that someone is calling from one of the register stations. In all other respects the operator station is identical to the register station.

Each of the telephone stations is connected to a relay circuit 26 which is arranged to give priority to the first register station having the handset lifted off its hook. The relay circuit automatically puts the busy signal out to each of the other stations and locks the other stations out of the circuit until the first station has hung up.

The first station to have its handset removed from the hook, is connected by the relay circuit 26 through to a connector circuit 28. The connector circuit includes suitable switching for connecting the particular register station to any one of a large number of memory units according to the group of digits dialed from the dial of the registry station. Storage units are indicated at 30. An additional digit dialed on the register station operates through the connector 28 to set a function selector circuit 32. The function selector 32 operates to set the selected storage unit to store some new piece of information according to the value of the additional digit dialed. Thus any one of the storage units can be interrogated from any one of the register stations by the first group of digits and can be modified to change the information stored by the additional digit dialed from the register station.

The operator station 22 may be located, for example, at the PBX board or the location of other personnel who need to know the information stored in all of the storage units. For this reason an annunciator panel is generally provided in conjunction with the operator station. The panel visually displays by a group of lights the information stored on each of the storage units 30. While not shown, additional annunciator panels can be readily provided at different stations if such is required for a particular installation. However, the annunciator panel is only required where there is a need to know at a glance the status of all the storage units. Any one of the storage units can be interrogated from any of the stations merely by dialing the proper group of digits identifying the particular storage unit.

The system of FIG. 1 as applied to a hospital installation, for example, would be arranged with the operator station 22 and annunciator panel 34 located at the PBX board. The register stations should be strategically located at various entrances and on different floors of the hospital. On entering the hospital, a doctor would pick up the handset of the register station at any convenient register station and if he did not receive a busy signal, dial in a first group of digits assigned to him for identifying himself. He would dial in an additional digit indicating that he was on the premises. The information that he was on the premises would be recorded in a particular storage unit. Anyone dialing the doctor's assigned number would then receive a signal from the storage unit indicating that the doctor was on the premises. The same information would be displayed on the annunciator panel so that the PBX board operator could tell at a glance that the doctor was on the premises. On leaving the premises, the doctor would again dial his identifying group of digits and dial an additional digit which would change the storage unit to store information that he had left the premises. The annunciator panel would be changed accordingly.

If a message is received for a doctor who is not on the premises or who can not be immediately reached, the operator can dial the doctor's number plus an additional digit indicating that she has a message for him. On entering the premises, or when free, the doctor could dial his number and receive a signal from the storage unit indicating that a message was being held for him.

Referring to FIGS. 2, 3 and 4, the circuit diagram of the automatic registrar system described above in connection with FIG. 1 is shown. FIG. 2 includes the register stations 10, 12 and 14, and operator station 22 plus the relay circuit 26. FIG. 3 is a circuit diagram of the connector circuit 28. FIG. 4 is the circuit diagram for the storage units 30, function selector 32, and annunciator panel 34.

As shown in FIG. 2, the register station 10 includes a hook switch 36 shown in the position it assumes when the handset is off the hook. In this condition, the hook switch connects one side of the handset 16 through a normally closed switch 38, which is part of the dial 18, to a line 40 by means of the contacts 4 and 5 of the switch 36. The handset 16 is grounded through a series resistor 42. The handset 16 is also connected through the switch 38 to a line 44 by contacts 1 and 2 of the switch 36 and through a series coupling capacitor 46 and resistor 48. Line 44 is also connected to ground through the lamp 20.

When dial 18 is actuated by turning it from its normal position, a normally open switch 50 is closed, by passing the handset 16 and connecting ground directly to the line 40. When the dial is released, the switch 38 is momentarily opened a number of times corresponding to the digit value selected on the dial, thus breaking the ground connection to the line 40 a selected number of times.

The operator station 22, as shown in FIG. 2, is substantially identical to the register station but with the addition of a buzzer control circuit which includes a relay 52 which is connected to a line 45 through contacts 5 and 6 of the hook switch 36 when the handset is on the hook. The relay is connected to a D.C. potential source at 54. When the line 45 is grounded and the handset is on the hook, the relay 52 is operated closing contacts 1 and 2 of the relay 52 and thereby connecting the buzzer 24 to the potential source 54.

The line 40 from each of the register stations and the line 45 from the operator station are connected respectively to one side of associated slow release relays, such as indicated at 56, 58, 60 and 62. Assuming the handset of station 10 is removed from the hook, the line 40 applies a ground connection to one side of the relay 58 which completes an energizing circuit from a negative potential source 64 through the normally closed contacts 3 and 4 of a relay 66 and through the normally closed contacts 2 and 3 of the relay 58. A holding circuit is completed through the contacts 4 and 5 of the relay 58 which connects the relay 58 back to the potential source 64 when the relay 58 is energized. In similar fashion, taking the handset off the hook at any of the other stations energizes a corresponding one of the other relays 56, 60 and 62. However, priority is established by the relay 66 which is energized in response to the closing of contacts 1 and 2 of any of the relays 56, 58, 60 and 62. When the relay 66 is energized, none of the other relays 56, 62 can be energized because the associated pairs of contacts 1 through 8 of the relay 66 are now open.

At the same time a busy signal is connected to the line 40 of all the stations but the one in use by means of a busy tone generator circuit 68 coupled through normally closed contacts 8 and 9 of each of the relays 56, 62 to the respective lines 40. The relay that is energized opens these contacts and closes contacts 7 and 8 which connects the line 40 of the selected register station to a dial tone generator 70 through normally closed contacts 5 and 6 of a relay 72. In this manner, when the handset is removed from the hook in one of the stations, a dial tone is received in that handset and a circuit is completed from line 40 through contacts 7 and 8 of the associated relay to an output line 74 which goes to the connector circuit 28.

As shown in FIG. 3, line 74 connects to one side of a relay 76, the other side of the relay being connected to a negative potential source 78. As soon as the handset is off the hook, a circuit is completed through the relay 76 from the potential source 78 back to ground through the line 40 and the switch 38 of the dial 18 of the registrar station in use. When the dial is turned to select a digit, switch 50 mutes the handset circuit. When the dial 18 is released, every time the switch 38 is momentarily open, the relay 76 momentarily drops out. The relay 76 momentarily releases a number of times corresponding to the value of the digit dialed. Since the relays 56, 62 are slow release relays, they are unaffected by the momentary interruption of the current path produced by the switch 38 of the dial 18. When the receiver is off the hook, energizing the relay 76, a slow release relay 80 is energized from a potential source 82 through normally open contacts 1 and 2 of the relay 76. Because it is a slow release relay, the relay 80 remains closed during dial pulses.

The pulsing of the relay 76 is used to operate a stepping switch, indicated generally at 84. The stepping switch has two switch banks 86 and 88 each having ten output terminals and a wiper arm, as indicated at 90 and 92 respectively. Wiper contacts 90 and 92 are stepped by a rotary coil (ROT) 94, the wiper arms advancing one contact each time the rotary coil is energized. A release coil (RLS) 95 resets the stepping switch. The stepping switch 84 includes an off-normal switch, designated O.N., which is actuated when the wiper arms 90 and 92 are advanced to the first contact and remain actuated through subsequent contacts. The switch O.N. is shown in its non-actuated condition.

At the first momentary release of the relay 76 by the action of the dial at the register station, a momentary ground connection is completed to the ROT coil 94 through the contacts 2 and 3 of the relay 76, contacts 1 and 2 of the now energized relay 80, through the initially closed contacts 3 and 5 of the O.N. switch, through the coil of a slow release relay 96, through the ROT coil 94 to a negative potential source 98. This sets the wiper arms 90 and 92 to the first contact and actuates the O.N. switch.

Assuming a digit value greater than 1 has been dialed as the first digit, the relay 76 is pulsed rapidly a selected number of times. This advances the rotary switch 84 by pulsing the ROT coil 94. This is accomplished by the now closed contacts 1 and 2 of the relay 96 and the now closed contacts 4 and 5 of the O.N. switch. Thus the wiper arms 90 and 92 come to rest at the contacts corresponding to the number of pulsations produced by the dial.

After the first digit is dialed and before the next digit is dialed, relay 96 drops out because of the normal delay between successive dialed digits. In this way ground is connected to the wiper arm 92 through the now closed contacts 4 and 5 of the relay 80, the normally closed contacts 4 and 5 of the relay 96 and the normally closed contacts 2 and 3 of a relay 100. Thus at the completion of the dialing of the first digit, ground is applied to a selected one of ten outputs derived from the switch bank 88 of the rotary switch 84. Actually the tenth contact is not used since this corresponds to dialing "0" for Operator, resulting in an entirely different mode of operation which will be explained hereinafter.

The switch bank 86 provides a ground to each of the first nine contacts, all of which are connected back to the dial tone generator 70 by a line 104, see FIG. 2. This short circuits the output of the dial tone generator 70, suppressing the dial tone following the dialing of the first digit.

Each of the nine contacts of the bank 88 is connected to a corresponding one of a group of identical connector circuits that are responsive to the next two dialed digits. Only one of these connector circuits is shown in FIG. 3, and is connected to the output of the first contact of the switch bank 88.

If the first digit dialed is a ten corresponding to the "0" for Operator, then the switch bank 86 provides a ground on a line 106 connecting back to the relay 72 in the circuit shown in FIG. 2. Thus an energizing circuit is formed through the relay 72 from a potential source 108. Relay 72 closes normally open contacts 4 and 5, connecting line 45 to line 74. The station having dialed "0" for Operator then effectively applies ground to both lines 74 and 45. This causes relay 52 to close which in turn provides an energizing circuit to the buzzer 24 from the negative potential source 54 through contacts 1 and 2 of relay 52. This sounds the buzzer 24 of the operator's station until the operator's handset is lifted off the hook. A talking circuit is then completed between the operator's handset through contacts 4 and 5 of the hook switch to line 45 which is connected to line 40 through contacts 7 and 8 of relay 58. Relay 56 also operates as an energizing circuit and is provided through contacts 2 and 1 of relay 72 from a potential source 73. The operation of relay 56 removes the busy tone supplied by generator 68. In this way, a direct voice communication channel is completed between the handset of the register station 10 and the operator station 22.

Assuming that the first digit has been a 1, relay 96 drops out prior to dialing of the second digit, although relays 76 and 80 remain energized. Ground is completed through the wiper arm 92 and contact 1 of the switch bank 88 to energize a relay 110 from a negative potential source 112. This closes normally open contacts 1 and 2 of relay 110 energizing a slow release relay 114 from a negative potential source 116.

When the dial 18 is released at the second digit, the switch 38 of the dial momentarily opens a number of times corresponding to the value of the second digit. This again causes the relay 76 to pulse. Each time the relay 76 drops out, closing the contacts 2 and 3, the relay 100 is energized from the source 102 through the contacts 2 and 3 of the relay 96 and the contacts 1 and 2 of the relay 80. Every time relay 100 is energized, the ground connection is momentarily interrupted to the relay 110 causing it to drop out. Thus both the relays 76 and 110 drop out a selected number of times according to the second digit dialed.

The pulsing of the relay 110 in response to the second digit dialed operates a Strowger switch, indicated generally at 118. The Strowger switch is a device for selecting a plurality of switch positions by first vertically selecting one of ten switch banks and then, by rotary motion, positioning the contacts at one of ten horizontal postions at the selected switch bank. In this way any one of a hundred switch positions may be selected. Each switch position may be arranged to complete a number of electrical circuits, the switch 118 shown in FIG. 3 being arranged to complete three such circuits designated respectively L1, L2 and L3. The three switch contacts, indicated at 120, 122 and 124, are vertically positioned at one of ten switch levels by VERT coil 126. The three contacts 120, 122 and 124 are rotated horizontally to one of ten positions at the selected vertical level by a ROT coil 128. The Strowger switch 118 also includes a vertical off-normal switch designated V.O.N. and a reset coil (RLS) 129.

The momentary dropping out of the relay 110 completes a circuit through the VERT coil 126, one side of which is connected to a negative potential source 130. A ground to the other side of the VERT coil 126 is completed through the contacts 2, and 3 of the relay 110, through the contacts 1 and 2 of the relay 114, through the contacts 3 and 5 of the V.O.N. switch, through the coil of a slow release relay 132. This raises the contacts 120, 122 and 124 of the Strowger switch 118 to the first switch level and actuates the V.O.N. switch. Subsequent pulsations of the relay 110 by the second digit dialed operates the VERT coil 126 by connecting a momentary ground through the contacts 3 and 4 of the V.O.N. switch and the contacts 1 and 2 of the now operated relay 132. Thus the contacts are raised to the proper level determined by the value of the second digit dialed.

The closing of relay switch 132 with the first dial pulse of the second digit operates a relay 134 from a potential source 136 by means of a ground connection through norally open contacts 4 and 5 of the relay 132. This provides a short circuit through contacts 1 and 2 of the relay 134 across the coil of a relay 138, preventing the relay 138 from being operated during the dialing of the second digit, namely, during the time the relay 132 is energized. At campletion of the dialing of the second digit, the relay 132 drops out because contacts 2 and 3 of relay 110 remain open for an extended interval before the third digit is dialed. When relay 132 drops out, relay 134 remains energized through a holding circuit provided by its own contacts 1 and 2 through a pair of normally closed contacts 2 and 3 of a relay 140, through the now closed contacts 1 and 2 of the V.O.N. switch to the now closed contacts 4 and 5 of the relay 114 and back to ground.

With the dialing of the third digit a circuit is completed from ground to the potential source 130 associated with the ROT coil 128 by means of the contacts 2 and 3 of the relay 110 through contacts 1 and 2 of the relay 114, now closed contacts 3 and 4 of the V.O.N. switch, through the normally closed contacts 2 and 3 of the relay 132 and the normally closed contacts 2 and 3 of the relay 138, to the coil of the relay 140 and the ROT coil 128. The energizing of the ROT coil 128 rotates the contacts 120, 122 and 124 of the Strowger switch 118 to the first set of horizontal contacts. On the energizing of relay 140, the contacts 2 and 3 are opened, breaking the ground connection to the relay 134 permitting it to drop out.

Subsequent pulses of the relay 110 by the third dial digit rotate the contacts 120, 122 and 124 to the desired horizontal contacts according to the value of the third digit. At the end of the third digit, the Strowger switch 118 connects the three lines L1 , L2 and L3 to one of a hundred groups of three output leads, only three groups of which are shown, namely, the group corresponding to the digits 100, 101 and 110. The first digit of course, is a 1 in all cases, corresponding to the first digit which sets the rotary switch 84 to the position 1. Each of the one hundred groups of output leads go to corresponding memory units in the storage circuit 30 as hereinafter described in connection with FIG. 4.

Circuit connections are completed to the leads L1, L2 and L3 going to the contacts 120, 122 and 124 of the Strowger switch 118 by means of the relay 138. After the completion of the dialing of the third digit, the slow release relay 140 drops out. This completes a connection from the potential source 136 through the relay coil 134, the relay coil 138, through the contacts 1 and 2 of the V.O.N. switch and the contacts 4 and 5 of the relay 114 to ground. When the relay coils 134 and 138 are connected in series, only the relay 138 is energized since it is designed to be sensitive to a much lower current level than the relay 134.

When the relay 138 is energized, a circuit is completed from the contact 120 of the Strowger switch through line L1, through now closed contacts 13 and 14 of the relay 138, through line *a* of the cable connection 141 back to the function selector 32, shown in detail in FIG. 4. Similarly the contact 122 is connected through lead L2 and contacts 10 and 11 of relay 138 back to the function selector 32 by line *b* of the cable 141. Contact 124 is connected through lead L3 and contacts 4 and 5 of relay 138 back to the lead 44 in the respective register and operator stations. This provides a path by which the selected memory unit in the storage circuit 30 is connected back to the calling register station 10.

The relay 138, when actuated, completes a path from the contact 3 of the relay 110, through the contacts 1 and 2 of the relay 114, the contacts 3 and 4 of the V.O.N. switch, contacts 2 and 3 of the relay 132, contacts 1 and 2 of the relay 138 through lead *d* of the cable connection 141 to the function selector 32. Relay 138 breaks the ground connection through the normally closed contacts 6 and 7 to the lead *c* of the cable 141 going to the function selector 32. The circuit is now in condition for receiving the fourth dial digit, which operates to establish a particular position in the selected memory unit in response to the function selector 32.

Referring to FIG. 4, each memory unit, three of which are indicated at 142, 144 and 146, includes a pair of latch relays 148 and 150. These latch relays are preferably of a type described in the co-pending application S.N. 21,396, filed April 11, 1960, by the same inventor and assigned to the same assignee. However, the latch relays 148 and 150 may be of any suitable type capable of assuming two stable operating conditions, namely, latched and unlatched. The relays shown are of a type having a permanent magnet which holds the relay latched following a pulse of one polarity. A pulse of the opposite polarity releases the relay.

By virtue of the two latch relays, each memory unit in the embodiment shown has four possible states, namely, both relays unlatched, both relays latched, and the two other states in which one of the relays is latched and the other is unlatched. In the embodiment shown, only three of these conditions produces a signficant indication. These three conditions are sensed at the calling station and at the annunciator panel by the presence of a signal, by the absence of a signal, or an interrupted signal. Obviously, the memory units may be expanded to include more memory states with corresponding identifying signals if so desired.

Interrogation of the selected memory units from the calling station is effected in the following way. After dialing of the first three digits, in the manner described above, a circuit is completed from lead 44 of the register station, through contacts 4 and 5 of the relay 138 and the selector circuit, through the lead L3 and contact 124, to contact 2 of the latch relay 148 in the selected memory unit. If the relay 148 is unlatched, contacts 1 and 2 are open and no signal is received at the register station. If the relay 148 is latched, a circuit is completed through the contacts 1 and 2 and through either the contacts 1 and 3 or the contacts 1 and 2 of the relay 150, depending upon whether the relay 150 is in an unlatched or latched condition. If the relay 150 is unlatched, a circuit is completed through the contacts 1 and 3 back to ground through the secondary winding of a transformer 152 and the secondary winding of a transformer 154 connected in series. The primary of the winding 152 is coupled to a 240 cycle per second voltage source and the primary of the transformer 154 is connected to a 60 cycle voltage source. The voltages derived from the two series connected transformers are thus connected back through the completed circuit described to the lead 44 of the register station and applied through the contacts 1 and 2 of the hook switch to the lamp 20, lighting the lamp. Thus the illumination of the lamp 20 is produced by one state of the memory unit. Also a steady 240 cycle per second audio signal is coupled to the handset 16 through the capacitor 46 and resistor 48.

If the latch relay 150 is in a latched condition, voltages derived from the transformers 152 and 154 are connected back to the lead 44 of the register station through an interruptor device 156 and the now closed contacts 1 and 2 of the relay 150. The interruptor device 156 pulses the voltage applied to the lead 44 so as to cause a flashing of the lamp 20 and produce an intermittent tone in the hand set 16.

The various signals may be assigned any desired meaning. For example, the lack of a signal on dialing a particular three digit number could indicate that a doctor is not on the premises. On the other hand, a steady tone and light indication could mean that the doctor is on the premises. The flashing light and intermittent tone could be interpreted as meaning that there is a message for the doctor. Obviously, additional types of signals and meanings for these signals could be established depending on the use to which the system is being put.

On the dialing of a fourth digit, the memory unit may be modified through the function selector circuit 32 according to the value of the additional digit. The function selector circuit 32, as shown in detail in FIG. 4, includes a stepping switch having three ten-contact switch banks indicated at 158, 160 and 162 with associated switch arms 164, 166 and 168. The rotary switch is advanced by a ROT coil 170 and is reset by a release coil (RLS) 172. The rotary switch also includes an off-normal switch O.N.

Dialing of the fourth digit again pulses the relay 110 of the connector circuit shown in FIG. 3 according to the value of the digit dialed, in the same manner as the second and third digits as described above. This time, when the relay 110 drops out, it completes the ground connection to the cable lead *d* going from the connector circuit 28 to the function circuit selector 32. Lead *d* connects through contacts 5 and 6 of the off-normal switch O.N., through the coil of a slow release relay 174, through the ROT coil 170 to a negative potential source 176. Because it is a slow release relay, the relay 174 does not drop out until the completion of the dialing of the fourth digit. The contacts 5 and 6 of the off-normal switch O.N. are now open.

After completion of the dialing of the fourth digit, the arms 164, 166 and 168 of the rotary switch are rotated to the selected contact. When relay 174 drops out, a circuit is completed from the potential source 176 through the now closed contacts 3 and 4 of the off-normal switch O.N., through a relay coil 178, the contacts 4 and 5 of the relay 174 to the lead *e* of the cable going back to the connector circuit of FIG. 3, the lead *e* being connected to ground through the contacts 6 and 7 of the relay 114. Energizing of the relay 178 places a positive or negative potential on selected contacts of the switch bank 158, 160 and 162.

Wiper arm 164 of the switch bank 158 is connected to the lead *a* of the cable going back to the connector circuit of FIG. 3. Lead *a* is connected by the connector circuit of FIG. 3 through contacts 13 and 14 of the relay 138 to the contact 120 of the Strowger switch 118 and from the Strowger switch connects back to the relay 148 of the selected memory unit. The other side of all the latch relays, including the latch relay 148, of the memory units are connected back to the wiper arm 168 of the switch bank 162. The wiper arm 166 of the switch bank 160 is connected to lead *b*, going back to the connector circuit of FIG. 3, through the contacts 10 and 11 of relay 138, to the wiper arm 122 of the Strowger switch 118 and thence to the latch relay 150 of the selected memory unit.

It will be seen that if the fourth digit dialed is a one, stopping the wiper arms on the first contact of the rotary switch in the function selector circuit 32, a positive potential is connected to one side of the selected latch relay 148 and a negative potential is connected to the other side of the latch relay 148 causing it to latch. If the fourth digit is a two, the polarity as applied to relay 148 is reversed, causing it to unlatch. If the fourth digit is a three, a positive voltage is connected to one side of the selected relay 150 and a negative voltage is connected to the other side, causing the relay 150 to latch. If the fourth digit dialed is a four, the polarity condition is reversed causing the latch relay 150 to unlatch.

For example, a doctor coming on the premises would dial his identifying number as the first three digits and then dial a one, causing the latch relay 148 in the selected memory unit to latch up. This would close contacts 3 and 4 of the relay 148 causing a lamp 180 on the annunciator panel 34 to be lit. If a message comes in for a doctor, the operator would dial the doctor's identifying number as the first three digits and then dial a three. This would cause the selected latch relay 150 to latch up. When a doctor checked in, he would then get a flashing signal at the register station telling that a message was waiting for him. On leaving the premises the doctor would dial his identifying number followed by the digit 1 to indicate that he was on the premises. After a message had been delivered to the doctor, the operator would dial his identifying number plus the number 4 to cancel the message indication by unlatching the relay 150.

When the handset is returned to its hook the various selector circuits are returned to normal but the memory units are unaffected. The hook switch 36, when the handset is replaced, removes the ground connection from one of the relays 56, 58, 60 or 62. The dropping out of these relays causes the relay 66 to drop out also. The dropping out of the relays in the relay circuit in turn causes the relays 76 and 80 to drop out in the connector circuit of FIG. 3. When relay 80 drops out, it completes a circuit from ground through contacts 2 and 3 of the relay 76, contacts 2 and 3 of the relay 80, contacts 1 and 2 of the off-normal switch O.N. through the release relay 95 to the potential source 98. The release relay when energized restores the rotary switch 84 to its initial standby position.

This, in turn, breaks the circuit to the relay 110 causing it to drop out and causing the relay 114 to drop out. When relay 114 drops out, it breaks the circuit from ground through contacts 7 and 6 to *e* of 141 to 4 and 5 of relay 174 to relay 178 causing relay 178 to drop out, thus first removing the battery from the function selector switch and preventing any voltage from wiping across contacts as the Strowger switch 118 returns to normal. When relay 114 drops out, it also breaks the circuit through relay 138, causing it to drop out also. A circuit is then completed from the potential source 130 through the release coil 129 of the Strowger switch through the contacts 6 and 7 of the V.O.N. switch, contacts 8 and 9 of the relay 138, contacts 2 and 3 of the relay 114 and the contacts 2 and 3 of the relay 110. Energizing the released coil resets the Strowger switch 118 to its initial condition. When relay 138 drops out, it completes a circuit to the release relay 172 of the rotary switch in the function selector circuit 32 as shown in FIG. 4. The whole circuit is thus restored to its initial operating condition ready for the next call from one of the register stations or the operator station.

From the above description it will be seen that a circuit is provided by means of which information may be stored in individual addressable memory units and selectively read out of these units from a plurality of different stations, from each of which it is connected to the control circuit by a simple two wire telephone line.

While the invention has been particularly described as an automatic registrar for registering doctors at a hospital, it will be apparent that the system may be adapted to a number of other situations. For example, the system may be used as part of a hotel room reservation register, in which case the operator station could be at the clerk's desk together with the annunciator panel. The register stations would communicate from the various floors of the hotel to be used to dial in information to the system that vacated rooms have been housecleaned and are ready for occupancy. The number of different functions which can be stored in each of the memory units can be expanded by additional latch relays without adding material to the overall complexity of the circuit.

What is claimed is:

1. An automatic registrar system comprising a plurality of telephone stations, each station including an audible signaling device, a telephone type dial, a switch, and a light; a plurality of memory units, each unit including a plurality of latch relays each having two stable operating states, means for generating a continuous signal, means for generating an interrupted signal, the latch relays connecting one or the other or neither of the signal generating means to the output of each of the memory units according to the existing stable conditions of the latch relays in the unit, a selector circuit, relay means responsive to the operation of any of the switches at the telephone stations for connecting only an associated one of the dials to the selector circuit when a switch is operated, means including the selector circuit for connecting the audible signaling device and light at the telephone station in which the switch is operated to the output of one of the memory units in response to a group of digits dialed at the telephone station, a function selector circuit, means responsive to an additional digit dialed at the telephone station following said group of digits for setting the function selector circuit, and means including the selector circuit for connecting the function selector circuit to the latch relays of the selected memory unit, the function selector circuit setting the latch relays to any one of the possible combinations of stable states of the relays according to the value of said additional digit.

2. Apparatus as defined in claim 1 wherein said relay means includes a control relay for each telephone station operated by the switch, the control relay completing a circuit from the dial of the particular telephone station to the selector circuit, and a priority relay having normally closed contacts completing the circuit through each control relay from the associated telephone station, and means including a switch operated by each of the control relays for energizing the priority relay whenever one of the control relays is actuated, the priority relay when actuating opening up the normally closed contacts to prevent any other of the control relays from being actuated.

3. Apparatus as defined in claim 1 wherein the selector circuit includes a relay for coupling connections between the selected memory unit, the telephone station and the function selector circuit, and means responsive to the dial at the particular telephone station for actuating the relay only after completion of dialing of said group of digits, whereby the memory unit remains electrically isolated until completion of the dialing of the group of digits.

4. An automatic registrar system comprising a plurality of stations, each station including a telephone type dial, a signal indicator, and a switch; a plurality of memory units, each unit including a plurality of latch relays each having two stable operating states, means for generating a continuous signal, means for generating an interrupted signal, the latch relays connecting one or the other or neither of the signal generating means to the output of each of the memory units according to the existing stable conditions of the latch relays in the unit, a selector circuit, relay means responsive to operation of any of the switches at the stations for connecting only an associated one of the dials to the selector circuit when the associated switch is operated, means including the selector circuit for connecting the signal indicator at the station in which the switch is operated to the output of one of the memory units in response to a group of digits dialed at the station, whereby the signal indicator is actuated by the output of selected memory units, a function selector circuit, means responsive to an additional digit dialed at the station following said group of digits for setting the function selector circuit, and means including the selector circuit for connecting the function selector circuit to the latch relays of the selected memory unit, the function selector circuit setting the latch relays to any one of the possible combinations of stable states of the relays according to the value of said additional digit.

5. An automatic registrar system comprising a plurality of stations, each station including a telephone type dial, a signal indicator, and a switch; a plurality of memory units, each unit including a plurality of latch relays each having two stable operating states, means for generating a continuous signal, means for generating an interrupted signal, the latch relays connecting one or the other or neither of the signal generating means to the output of each of the memory unit according to the existing stable conditions of the latch relays in the unit, a selector circuit, means including the selector circuit for connecting the switch at the station in which the switch is operated to the output of one of the memory units in response to a group of digits dialed at the station, a function selector circuit, means responsive to an additional digit dialed at the station following said group of digits for setting the function selector circuit, and means including the selector circuit for connecting the function selector circuit to the latch relays of the selected memory unit, the function selector circuit setting the latch relays to any one of the possible combinations of stable states of the relays according to the value of said additional digit.

6. An automatic registrar system comprising a plurality of stations, each station including an indicating device and a device for selectively producing any one of a plurality of coded signals, a storage circuit including a plurality of memory units, each memory unit being settable to any one of a plurality of stable states in accordance with the characteristics of an applied coded signal, means including a selector circuit operated in response to a first coded signal generated at any of said stations for connecting the indicating device at the signaling station to one of the memory units in the storage circuit identified by the first coded signal, means responsive to the stable state of the selected memory unit for actuating the indicating device to indicate the state of the selected memory unit, and means responsive to an additional coded signal from the coded signal generating means coupled to the selected memory unit by the selector circuit for resetting the selected memory unit to any one of its stable states as determined by the particular coded signal.

7. An automatic registrar system comprising a plurality of telephone stations, each having a telephone type dial, a plurality of memory units, each memory unit being settable to any one of several stable states in response to input signals which are coded to identify the respective stable states, switching means responsive to the dial at any one of the telephone stations for connecting a selected one of the memory units to the particular telephone station in response to a first group of dialed digits, means responsive to the particular stable state of the memory unit for generating a signal at the connected station indicative of the particular stable state, and switching means responsive to at least one additional digit dialed from the particular telephone station following the dialing of the first group of digits for establishing any selected new stable state in the selected memory unit according to the value of the additional digit.

8. An automatic registrar system comprising a plurality of stations, each station including means for generating selected groups of coded signals, a plurality of memory units, each memory unit having several identifiable states, means for setting each memory unit to any one of these states in response to input signals coded to identify the desired state of the memory unit, means responsive to the coded signal generating means at any one of the stations for completing a connection between a selected one of the memory units and the signalling station in response to a first group of coded signals, the selected memory unit being identified by the first group of coded signals, means responsive to the state of the memory unit for generating a signal at the connected signalling station indicative of the particular state of the selected memory unit, and means for transmitting an additional coded signal from the signalling station to reset the memory unit to any selected state.

References Cited in the file of this patent

UNITED STATES PATENTS

| | | |
|---|---|---|
| 2,330,355 | Hershey | Sept. 28, 1943 |
| 2,330,356 | Belleveau | Sept. 28, 1943 |
| 2,330,358 | Johnson | Sept. 28, 1943 |